United States Patent
Arter et al.

[11] 4,285,017
[45] Aug. 18, 1981

[54] STRIPE FOLLOWING IN A HELICAL SCAN DEVICE

[75] Inventors: Nelson K. Arter, Longmont; Francis E. Hauke, Boulder, both of Colo.; Jesse A. Weber, Tucson, Ariz.

[73] Assignee: International Business Machines Corporation, Armonk, N.Y.

[21] Appl. No.: 9,315

[22] Filed: Feb. 5, 1979

[51] Int. Cl.³ .............................................. G11B 21/10
[52] U.S. Cl. ........................................ 360/77; 360/76; 360/109
[58] Field of Search ........................ 360/77, 75, 76, 78, 360/10, 107, 109; 179/100.1 G, 100.3 V; 358/128.5, 128.6

[56] References Cited

U.S. PATENT DOCUMENTS

| | | | |
|---|---|---|---|
| 3,126,535 | 3/1964 | Streeter | 360/77 |
| 3,526,726 | 9/1970 | Corbett et al. | 360/76 |
| 3,845,500 | 10/1974 | Hart | 360/77 |
| 4,099,211 | 7/1978 | Hathaway | 360/109 |
| 4,141,048 | 2/1979 | Kubota et al. | 360/77 |
| 4,148,082 | 4/1979 | Okada et al. | 360/77 |
| 4,151,570 | 4/1979 | Ravizza et al. | 360/77 |
| 4,163,994 | 8/1979 | Sakamoto et al. | 360/70 |
| 4,165,523 | 8/1979 | Hathaway | 360/77 |
| 4,167,763 | 9/1979 | Kubota | 360/77 |
| 4,172,265 | 10/1979 | Sakamoto et al. | 360/70 |
| 4,204,234 | 5/1980 | Noble | 360/77 |

Primary Examiner—Bernard Konick
Assistant Examiner—Donald McElheny, Jr.
Attorney, Agent, or Firm—Joscelyn G. Cockburn

[57] ABSTRACT

In a helically scanned device, a length of flexible media, with transverse data tracks thereon, is positioned relative to a rotating transducer. The transducer coacts with the media to transduce data therefrom. The transducer is coupled to a piezoelectric bender. Periodically, the instantaneous position of the transducer is monitored and an error signal is generated. The error signal is used to drive the piezoelectric bender so that the transducer follows the data track.

9 Claims, 10 Drawing Figures

STRIPE FOLLOWING IN A HELICAL SCAN DEVICE

CROSS REFERENCE TO RELATED PATENTS

U.S. Pat. No. 3,845,500 issued to Gary A. Hart on Oct. 29, 1974, on Application Ser. No. 415,080 describes a rotating head tape unit in which a length of magnetic tape adjacent to the rotating head is servo controlled to accurately position a traverse tape data track in alignment with the head. The tape format includes a longitudinal servo track with traverse data track. A portion of the servo track is read by the rotating head as said head sweeps traversely across the tape. The format for the servo track includes a constant frequency pattern having periodic sync marks which define the center of a traverse data track. The signal derived from the servo track, by the rotating head, constitutes a clock which drives an up/down counter. The counters counting state changes as the head sweeps the servo track. Any residual count in the counter is a measure of head track misalignment. The patent allows the rotating head to be aligned with a straight data track or at least to be positioned within the vicinity of a deformed track.

BACKGROUND OF THE INVENTION

1. Field of the Invention

This invention relates to the field of magnetic recordings, and more specifically, to magnetic tape units employing one or more rotating heads which record and/or reproduce machine-convertible information while moving in transducing relationship with a magnetic web media or tape, this information being orientated as magnetic domains to form information tracks which extend generally traverse to the longitudinal tape length.

2. Description of the Prior Art

Rotating head magnetic tape units are widely known. In one form a generally cylindrical guide, sometimes referred to as a mandrel or drum, includes a rotating head wheel which carries one or more magnetic read/write heads. The magnetic tape engages the guide means, at one point, makes a helical wrap about at least a portion of said guide means, and exits the guide means at a point which is both axially and circumferentially spaced from the entrance point. The angle of helical wrap can vary in accordance with design choice, but is usually between 180 degrees and 360 degrees. The head wheel rotates so as to sweep its magnetic head or heads traversely across the tape. The angle at which the head enters and exits the tape may vary, in accordance with design choice, from slightly less than 90 degrees to a small angle such as 15 degrees.

Another type of device is one wherein the head wheel is associated with a tape guiding structure which bends the tape traversely into an arcuate shape that conforms to the circumferencial shape of the head wheel. In this device the tape travels in a generally straight line past the head wheel, and is traversely bent by the associated guides as it enters the head wheel area.

The present invention finds utility with either aforementioned type of device, and has been found particularly useful with the helical wrap device.

A major problem encountered in the aforementioned devices is that of maintaining accurate positional alignment (that is registration) between the path of the head wheel carrying the transducing head or heads and skewed oblique data tracks on the media. The skewed condition is particularly true when a data track is written by one tape unit and later read by another tape unit. The skew or misalignment phenomenom between tapes written and read on different tape transport units stems from the fact that the angle at which the oblique data track is recorded on the writing unit differs from the angle at which the reading unit accesses (that is traverses) the recorded track.

Another major problem facing the prior art rotating head devices is the inability of the device to follow a deformed data track and to recover data recorded in the deformed tracks. Due to the lack of track following capabilities, data which are located within deformed tracks are often lost. In an attempt to remedy the problem data tracks are recorded wider than is necessary. The justification for wide tracks (i.e., tracks in the range of from 15 mils to 20 mils) is that if one or more tracks are deformed the data may be recovered. However, wide tracks significantly reduced area data density on the media. This means that on each data cartridge less data is recorded thereon. The current trend in data storage devices is to improve the areal density. One likely solution is to narrow the data tracks within the range of from 2 mils to 8 mils. In order to foster reliability in a narrow track storage system the need arises for a device which is capable of accurately following a data track.

A probable source for the skew problem and deformed data track problem is media deformity. Generally, the media which is used for data recording is flexible and is somewhat sensitive to changes due to the temperature, humidity, pressure, time, warping, etc. Although the recording angle of a data track is within a prescribed range at the time of recordation, any changes in the aforementioned parameters (that is temperature, time, pressure, humidity, etc.) will tend to deform the media (that is the media will expand or contract) generally anisotopically. The deformation changes the angle at which the data track was originally recorded. With a change or deviation in the recordation angle, when an attempt is made to recover the prerecorded data the recording head or heads cannot faithfully trace (i.e., follow) the deformed data tracks and, as such, all or part of the information maybe lost.

A stop gap measure which aims at solving the deformed tracks problem, is to store the recording media under stringent conditions. For example, it is often required that the media be stored in a storage area having prescribed temperature and humidity control. Also, in some situations, the recording media is assigned a useful lifespan at the end of which the data, recorded on the media, has to be transferred to another recording media or re-recorded on the same media. These requirements impose relatively high maintenance costs on a customer while in some cases do not guarantee faithful and/or accurate retrieval of prerecorded data.

Another partial solution is to impose strict manufacturing tolerances for the data recording/reproducing device (DRD). By imposing a strict manufacturing tolerances, it is hoped that the different components in a DRD will fit accurately and minimized misalignment (one of the causes for the track following problem) not only in the same unit but also between different units. However the imposition of strict manufacturing tolerances requirement tends to increase manufacturing cost.

Still another means which the prior art adapts to solve the aforementioned track following problem is a static means as opposed to a dynamic means. Generally, in the prior art rotating head device the magnetic media is guided onto the rotating head via an entry guide and is guided away from the rotating head via an exit guide. In the prior art, skew is corrected by manually adjusting the rotating head and/or manually adjusting entry and/or exit guides. This adjustment effectively changes the angle which the rotating head accesses (i.e. enters) a recorded track on the recording media and effectuates limited skew adjustments. The problem with this type of skew correcting scheme is that it is either done once in the factory prior to shipment or requires the services of a skilled technician to conduct the adjustment. Moreover, this type of adjustment does not allow magnetic transducers to follow a deformed track. In fact, this limited approach does not address the problem of recovering data from deformed data tracks. A more detailed description of a device which uses manual means for limited skew correction is disclosed in U.S. Pat. No. 3,697,676, issued to Orville I. Protas.

In another form of prior art static adjustment, the means for shifting the head wheel and/or the tape guides are automatic. With this type of device, the adjustment is done without external or manual intervention. Although this approach is a significant improvement over the aforementioned manual prior art skew adjustment, its defect is that there are situations wherein it does not afford the recovery of data. For example, in situations wherein a data track is deformed with a bowed trajectory within the intermediate portion of the oblique data track, the data cannot be satisfactorily retrieved using the prior art scheme of adjustment. Since, the adjustment is made at a time prior to the beginning of the head trace across the selected data track.

Probably, one of the main defects with the prior art static skew correction scheme, be it manual or automatic, is that it does not allow for track following which enables the head to follow a skewed and deformed data track or a skewed data track or a deformed data track to recover data therefrom.

SUMMARY OF THE INVENTION

It is, therefore, the object of the present invention to disclose an apparatus and method which enable a transducer to follow a skewed or distorted data track more accurately than was heretofore been possible.

In accordance with the present teachings, a transducer is mounted to a free end of a bimorph piezoelectric beam. The other end of the bimorph piezoelectric beam is restrained. A means is provided for supplying a controlled voltage across said beam. The bimorphemic beam with attachments is mounted on a head wheel which rotates so that the transducer traces a traverse data track across a flexible media helically wrapped about the transducer. When the controlled voltage is supplied to the bimorph piezoelectric beam the head vacillates or moves in a direction normal to the traverse data track thereby allowing recovery of data recorded in skewed or distorted data tracks.

In another feature of the invention the transducer is mounted to a linear motor (e.g. a voice coil). The controlled voltage is then applied to the motor which vacillates the head to recover skewed data.

In order to derive the controlled voltage a plurality of controlled servo tracks are prerecorded on the media. The tracks are positioned to run parallel with the lengthwise dimension of the media. Controlled information, in the form of magnetic transitions is recorded in the servo tracks. As the head traverses the servo tracks electrical signals are generated from the controlled information. A controller processes the electrical signals and generates the controlling voltage for driving the bimorph piezoelectric beam or the linear motor.

In another feature of the invention the controlled voltage is generated from the algebraic sum of a dither voltage and a feedback error voltage. More particularly, a dither oscillator generates a dither signal which is applied to the bimorph piezoelectric beam or the linear motor. As a result the head traverses an imposed distorted path. The signal is such that the distortion created in the head path, in both amplitude and frequency, is greater than or equal to the amplitude and frequency of a data track. As is used herein the terms amplitude and frequency are intended to describe the physical characteristics of the data tracks (for example, distortion) and does not describe the data recorded in the tracks. Two sets of sampling pulses are developed from the dither signal. One set of the pulses are used for gating the peaks of the dither signals and generating a first set of control pulses indicating the position of the head, at the peak of distortion. Likewise, the other set of sampling pulses are used to generate a second set of control pulses indicating the position of the head at the valley of the distortion.

A feedback signal is next derived from the head. The signal indicates the actual position of the head. The feedback signal is compared with the control pulses to generate an error voltage when the head is off center of the imposed distorted path which subtends the data track. The error signal is used to drive the head onto the center of the imposed distorted path and hence recover data in the track.

The foregoing and other objects, features and advantages of the invention will be apparent from the following more particular description of preferred embodiments of the invention, as illustrated in the accompanying drawings.

DESCRIPTION OF THE PREFERRED EMBODIMENT

As is used in this specification, the term BIMORPH means a device comprising of two layers of a crystal cemented together.

The terms BIMORPH motor means an actuator comprising of two layers of a piezoelectric material (bimorph) which is able to transport a load when an electrical signal is applied to the bimorph.

The device and method described hereinafter, for track following, finds application in any environment where it is necessary for a transducer to follow a data track accurately. The present invention works well with a rotating head tape transport unit and as such will be described in that environment. However, this should not be regarded as a limitation on the scope of this invention, since it is within the skill of the art to modify the invention without departing from the scope and spirit of this invention.

Figure 1:
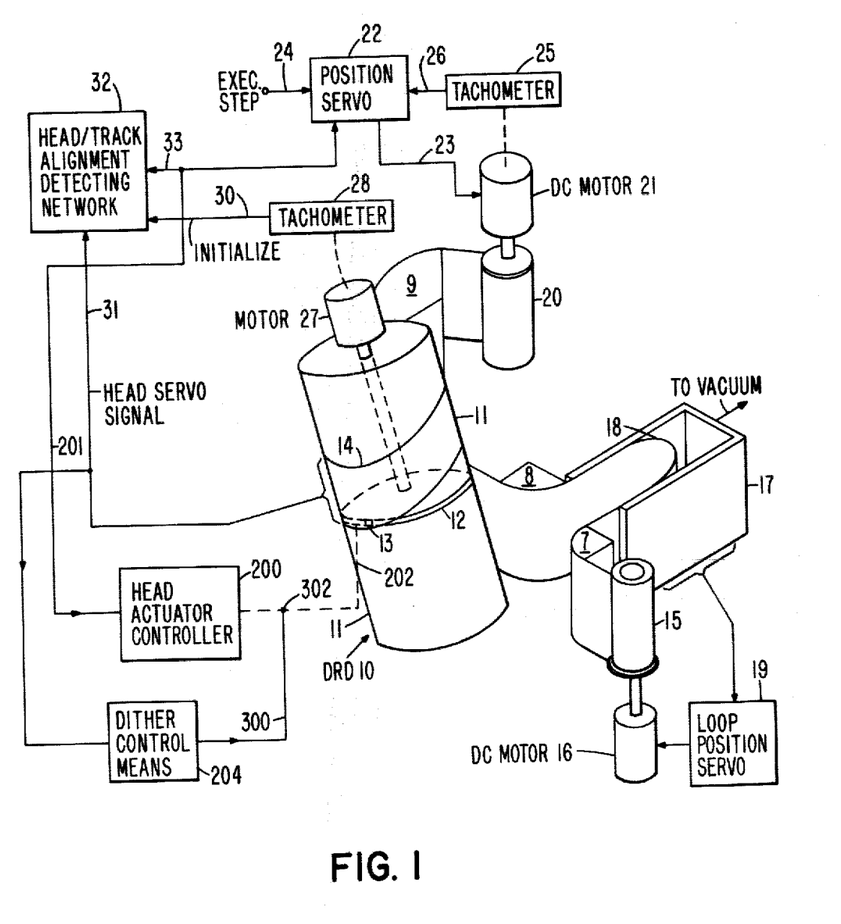
FIG. 1 discloses a rotating head magnetic tape unit whose head is controlled in accordance with the present invention.

Referring now to FIG. 1, a helically wrap rotating head magnetic tape unit incorporating the present track following invention is disclosed. More particularly, this device may be of the type more completely described in the above identified U.S. Pat. No. 3,845,500, and commonly assigned. As more particularly described herein, this rotating head magnetic tape unit includes a data recording device (DRD) 10 in the form of a two section mandel 11 with an intermediate rotating head wheel 12 carrying a transducing assembly 13. As will be described more fully hereinafter transducing assembly 13 incorporates portion of the present invention. A length of tape 14 is helically wrapped about the center of mandel 11 and transducing assembly 13 traces a traverse path across the width of this length of tape.

A tape supply is contained on supply spool 15. The spool is controlled by direct current DC motor 16. As tape is payed out (that is leave) spool 15, a segment of the tape is maintained in vacuum column 17. The vacuum column serves to maintain one end of the tape under constant tension. Tape loop 18, contained within the vacuum column is positioned monitored by loop position servo 19. This servo in turn controls the energization of motor 16 to maintain an optimum loop length in the column. The loop position sensor, which may be of the type described in U.S. Pat. No. 3,122,332, F. G. Huges, Jr., provides bidirectional and variable magnitude energization of motor 16. Thereby maintaining loop 18 at an optimum position, as the tape moves in either direction relative to supply spool 15. The other end of the tape length 14 which extends through the DRD 10 is maintained under tension by way of take-up spool 20 and spool motor 21. A plurality of tape guides 7, 8, and 9, respectively are positioned within the tapes' path and guide the tape as it is transported from the supply spool to the take-up spool and vice versa.

For explanation purposes the device shown in FIG. 1 incorporating the present invention will be described in the environment of an incrementing tape unit. That is a tape unit which produces step by step rotation of spool 20, maintaining the tape stationary as head wheel 12 positions the transducing assembly 13 to read/write (hereinafter called transduce) data on the media. However, the present invention is not to be restricted to this configuration since generically this configuration can be defined as one in which the tape motion is very slow when compared to the rotary motion of transducing assembly 13. More particularly, the linear speed of head assembly 13 relative to stationary tape 14 is approximately 1,000 inches per second. Within the teachings of the present invention, the tape section 14 may remain stationary as the head sweeps the tape or may move at a relatively low speed such as for example, 10 inches per second.

The incremental or step-by-step positioning of a selected data track on tape section 14 relative to the path of head wheel 12 is controlled by position servo 22 whose output 23 is operable to energize motor 21. More particularly, position servo 22 receives a request to execute a given movement step on conductor 24. Usually, the request is that the head assembly 13 be positioned relative to a specific data track on the tape. This input signal results in energization of motor 21. Tachometer 25 provides a closed loop servo feedback on conductor 26 to which the requested step command is compared. As a result motor energization is terminated upon the completion of the requested step. More particularly, this above described servo apparatus may be as described in the U.S. Pat. No. 3,864,739, issued to H. C. Jackson, and commonly assigned.

Still referring to FIG. 1, head wheel 12 is driven by motor 27 and rotates at a constant velocity. This motor also controls the rotation of tachometer 28. The tachometer functions to determine the instantaneous position of transducing assembly 13 in its 360° path. Also, the helical tape wrap 14 about mandel 11 includes a gap at the back side of the mandel. At this rotational position the head assembly is not in contact with the tape but rather is moving at a high speed toward the edge of the tape, preparing for a traverse sweep across the tape. One of the functions of tachometer 28 is to provide an output signal on conductor 30 indicating that head 13 is about to begin a sweep across the helical tape wrap.

As will be apparent from the following description, a head envelope signal is provided on conductor 31. The signal is provided as an input to head/track alignment detecting network 32. This network is effective to originate a head track alignment error if one exists on conductor 33. This signal controls fine positioning of motor 21 by way of position servo 22 to correct any error in alignment between the entry position of head assembly 13 and a particular traverse data path carried by the helical wrap of tape.

Once the initial alignment is completed, any misalignment between the selected track and the head assembly which may stem from track skew and track deformity are corrected in accordance with the teaching of the present invention. In order to alleviate the misalignment problem, so that the head assembly 13 follows a track successfully and reproduce data therein, the head envelope signal on conductor 31 is supplied to a head acutator controller 200 by conductor 201. The head acutator controller generate correction signals on conductor 202 which forces the head assembly 13 to follow the selected data track. A dither control means 204 coacts with the head actuator controller and the signal envelope to effecuate an alternate correction scheme. In the alternate correction scheme the feedback signal generated on conductor 31 is processed by the dither control means which ouput a signal on conductor 300. The signal outputted on conductor 300 is used to drive head assembly 13 so that data recorded in skewed and deformed data tracks are recovered. Both of these head correction methods will be described more fully hereinafter.

Figure 7:
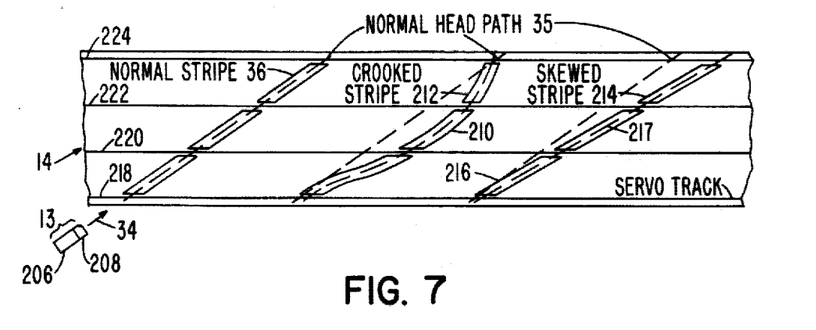
FIG. 7 shows a length of tape with a tape format according to the present invention.

Referring now to FIG. 7, a diagramic form of the tape's data tracks and servo tracks format according to the present invention is shown. This diagram is helpful in understanding the problems associated with this type of device and the solution to the problem which is addressed by the present invention. In this diagram, transducer assembly 13, which includes the head actuator 206 and transducer 208, is shown moving in the direction of arrow 34 along a normal head path identified by broken line 35. This head path is termed normal in that it coincides with the center line of traverse data track or stripe 36. Thus, as transducer 208 follows path 35 the data contained within normal track 36 will be accurately transduced, this term include either the read or write function. As is evident from FIG. 7 track 36 is a normal stripe. This means that the stripe is not deformed relative to its center line and that a transducing assembly traversing track 36 along broken line 35 will access data recorded in said track. Track 210 is positioned relative to track 36. In contrast, track 210 is a deformed or crooked stripe. This means that the stripe is not symmetrical with respect to center line 35 of a normal path. Should the transducing assembly travels along path 35, the data recorded in stripe 210 will not be transduced. It is this defect which the present invention addresses and will correct.

The present invention forces the transducing assembly to traverse the crooked stripe along the center line 212 to recover the data therein. A similar situation is shown with stripe 214. Stripe 214 is the so-called skewed stripe. The stripe is skewed in that it is rotated at a point for example, 216 relative to the normal head path 35. Similarly, if head assembly 13 traverses the tape along path 35, information recorded in stripe 214 will not be recovered. The present invention therefore corrects the transducing assembly to traverse the tape along path 217 to recovery data recorded in the skewed stripe.

Still referring to FIG. 7, longitudinal servo tracks 218, 220, 222, and 224 are positioned across the width of tape 14. As will be explained subsequently, the servo tracks are needed to obtain midcoarse correctional signal which forces head assembly 13 to follow a skewed and/or deformed data track in a linear or piecewise linear fashion. It should be noted that although four longitudinal tracks are shown, any number of tracks can be placed on the media. The closer the track the more accurate will be the track following capability of the system, since the frequency of error signal for positioning the head will be greater. Therefore, the number of servo tracks should not be regarded as a limitation on the scope of this invention. To afford proper operation, at least three longitudinal servo tracks or stripes are needed on the tape. Two of which would be positioned similar to track 218 and 224, respectively. Track 218 is used for positioning the transducing assembly relative to a selected track. Track 224 is optional and is used to check if the head had traversed the selected track along the ideal head path. A third longitudinal servo track such as 220 is positioned within the vicinity of the center of said media and functions to generate a midcoarse correction error signal.

The placing of the servo tracks on the tape can be achieved by a plurality of conventional method. One of these methods would be to pass the tape under a recording device having a magnetic transducer having a predetermined number of head gaps equivalent to the number of servo tracks to be placed on the tape. This type of device is often called a servo writer.

Another method would be the so-called buried servo method. An example of the buried servo method is described in U.S. Pat. No. 3,404,392 issued to F. J. Sordello. In the buried servo method, two magnetic layers of different coercivity are used to fabricate tape 14. The longitudinal servo tracks are recorded in one layer of the media while data tracks are recorded in the other. A single gap magnetic head is used for simultaneously reading signals from both the servo tracks and the data tracks whereby the servo signal is used for track following.

Alternately, a single magnetic layer with a single coercivity maybe used to fabricate tape 14. However, the servo signal and the data signal are recorded at two different frequencies; so that the rearrangement of the magnetic particles occurs at different depth in the media.

It is worthwhile noting that if data and servo information are written in the same layer of the media then in order for a single head to transduce servo and data information areas of the data track within the close vicinity of the servo track must be void of data information.

Still referring to FIG. 7 the lower edge of tape 14, that is the tape's edge first encountered by transducer assembly 13, includes servo tracks 218 followed by 220, 222, and 224, respectively. Each of the servo tracks have a common format which is a distinctive data pattern in the form of a sync mark which identified the physical position of a data track and a clock frequency pattern both of which will be described hereinafter. Although, not shown in FIG. 7, the entire length of media 14 beginning from the supply spool to the take-up spool (FIG. 1) includes a large number of closely packed narrow data tracks. By way of example, narrow means the track is within the range of 1 mil to 8 mils wide. Also, the servo format includes a distinctive sync mark one of each identifying the center line for each of the data tracks.

While the present invention is not to be limited thereto, the prefered form of the present invention includes a supply of tape 15 FIG. 1 having a prerecorded number of servo tracks such as servo track 218, 220, 222, and 224 and a blank data track area. As the tape data track area is filled, each data track is placed in correct position by reading the servo track, and more particularly the position of the sync mark within servo track 218 and/or 224 relative to the path of transducer assembly 13. If a registration error exists, slight adjustment of the tape occurs to achieve initially alignment between head path 35 and the transducer prior to enabling the transducing function of the magnetic tape unit. As is used in this application registration means that at the lower edge of the tape the head assembly is in the vicinity of a selected track. The alignment of transducer assembly 13 with a selected data track to enable registration is clearly described in the above reference U.S. Pat. No. 3,845,500 and does not form part of the present invention. Instead the present invention allows the rotating head device described herein to faithfully follow a data track once the head is positioned in registry or in the vicinity of the data track.

Figure 2:
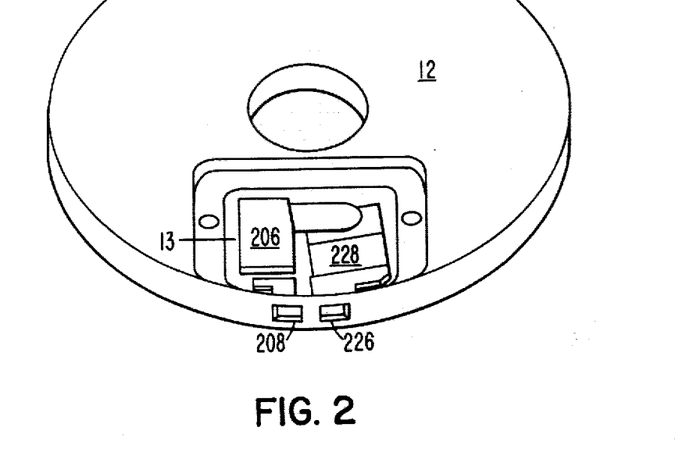
FIG. 2 shows a head wheel with a mounting cavity therein.

Referring now to FIG. 2, a pictorial view of head wheel 12 together with transducing assembly 13 is shown. As is evident from FIG. 1, head wheel 12 is mounted to a shaft and is rotated by motor 27. The head wheel (see FIG. 2) is fabricated with two traverse cavities through which transducers 208 and 226 protrudes. When positioned relative to a length of media the transducers transduce data from the media. Transducer 226 is the write transducer. Transducer 208 is the read transducer. The write transducer is attached to transducer support means 228 and the transducer support means is firmly connected to the head wheel. Since the present invention is particularly concerned with the read transducer, the write transducer will not be described any further. Suffice it to say, that data to be written on the media is supply in the form of electrical signals to the write head. The read transducer is mounted to actuator 206. The actuator is firmly attached to the head wheel within an arc-like circumferential cavity. During a read cycle, transducer assembly 13 which includes read transducer 208 and actuator 206, performs the reading function so that any data which is recorded in skewed or deformed data tracks is retrieved according to the teaching of the present invention.

Figure 3:
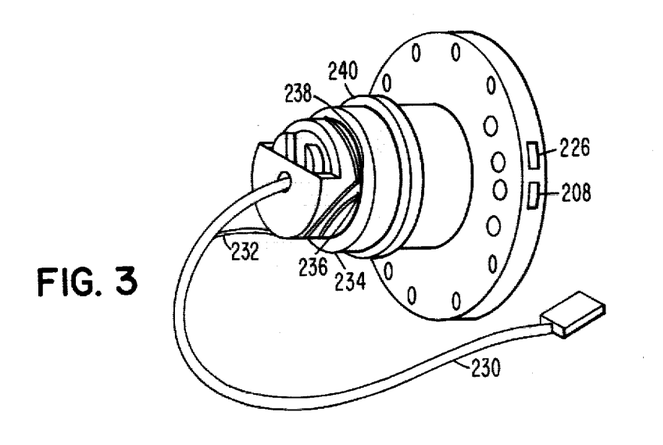
FIG. 3 shows the head and head actuator mounted in the head wheel of FIG. 2.

Referring now to FIG. 3, the head wheel is shown with the arc-like circumferential cavity (shown in FIG. 2) covered. Electrical signals to and from transducer 208 and 226 are transmitted via conductor 230 and a pair of read/write coupling transformers, (not shown). Likewise, controlled signals to actuator 206 are transmitted through conductors 232 which are connected to a stationary part 234 of a slip ring at terminals 236 and 238, respectively. The signal is then conveyed to a moving part 240 of the slip ring from which it is conveyed through conductor (not shown) to the actuator 206. Likewise, read/write signal is carried from the rotating transformer, not shown, through conductor (not shown) to transducer 208.

Figure 4:
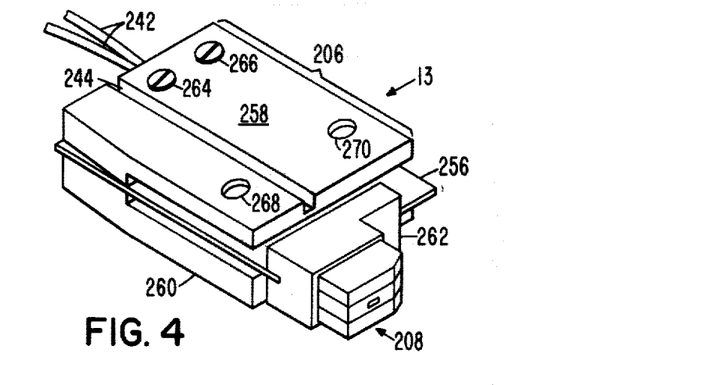
FIG. 4 shows a pictorial view of the head and head actuator according to the present invention.
Figure 5:
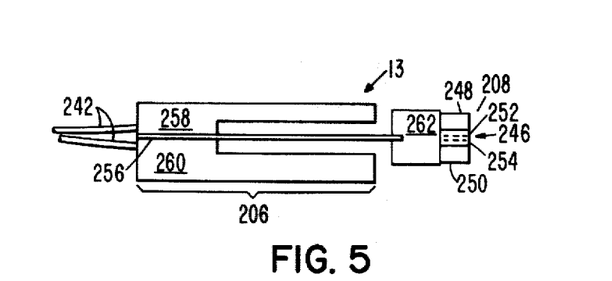
FIG. 5 shows a side view of the head and head actuator.

Referring now to FIGS. 4 and 5, a pictorial view and a side view of transducing assembly 13 is shown. The transducing assembly includes a head acutator 206 hereinafter called a bimorph motor 206 and a transducer 208 connected to said bimorph motor by a transducer mounting bracket 262 hereinafter called transducer holder 262. Although any type of conventional magnetic transducers which are able to transduce (that is write or read) magnetic information on a length of magnetic tape is suitable for use with the present invention, a preferred type of magnetic transducer is of the type described in U.S. Pat. No. 3,961,372, issued to George W. Brock et al. The subject patent is characterized by a bonded composite structure including a magnetic core 246 (FIG. 5) and a pair of sliders non-magnetic material such as ceramic 248 and 450, respectively. A transducing gap (not shown) is positioned within magnetic core 246 with a pair of slots 252 and 254, respectively, running along the lengths of the magnetic transducer and on each side of the gap and perpendicular to said gap.

Still referring to FIGS. 4 and 5 in conjunction with FIG. 7, bimorph motor 206 vacillate (i.e., oscillate) transducer 208 in a direction orthogonal to normal head motion along head path 35 and as a result the head is constrained to follow a selected data track. More particularly, the head is forced to recover data from a skew and/or deformed data track. As was stated previously the oscillatory motion may be imparted to the head by a voice coil motor.

The bimorph motor includes a rectangular bimorph 256 firmly clamped at one end between a pair of rectangular/L-shaped rotor mounting brackets 258 and 260, respectively. The transducer holder 262 is attached to the free end of the bimorph and a transducer 208 is connected to the transducer holder. Although a plurality of means (such as adhesive) can be used for firmly attaching the rotor mounting brackets to one end of the bimorph in the preferred embodiment of this invention, a pair of screws 264 and 266, respectively are used as the clamping member. Also a pair of screws (not shown) mate with receiving holes 268 and 270 and firmly connect the bimorph motor to rotor 12 (FIG. 2). A channel 244 is fabricated in one of the L-shaped mounting brackets. A conductor (not shown) which delivers signal to and from head 208 is threaded through the channel. As is evident from FIGS. 4 and 5, the bimorph is mounted in a motor delivered mode with the free end supporting transducer 208 and the transducer holder. As will be evident from the following description of a bimorph when a signal preferably a voltage is applied to the bimorph through conductors 242 a bending motion is induced in the free end of the bimorph and as a result the transducer is translated in a direction perpendicular to the normal direction of head travel and recovers data recorded in a desired data track. Since the bimorph is imparting a linear motion to the transducer it is performing somewhat analogous to a linear motor and hence the coined phraselology used in this application namely "bimorph motor". It should be noted however, that the bimorph motor unlike a linear type motor is not an electromechanical device and therefore does not generate magnetic field which would adversely affect the recordation of data on the media. Although a voice coil motor would transmit the necessary oscillatory motion to the transducer its use is less desirable since it would generate magnetic fields which would tend to interact unfavorably with the data recorded on the media. Of course, by selectively winding the coils on a voice coil motor the adverse effect can be minimized.

Figure 6:
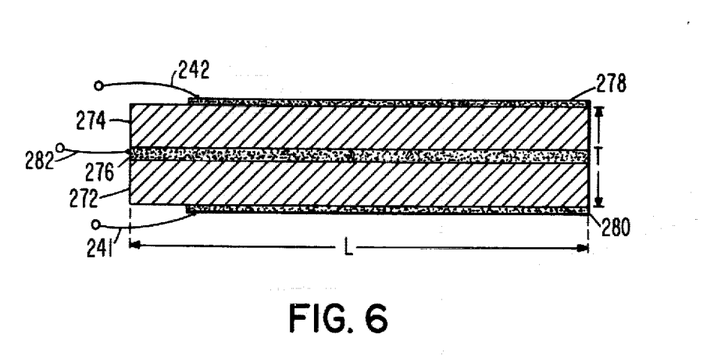
FIG. 6 shows an expanded cross-sectional view of the components forming the head actuator.

Although the general theory of bimorphs is documented in the various literature, it is worthwhile reviewing some of its characteristics and the head limiting parameters which enable its use as a actuator in a rotating head device. Turning now to FIG. 6 for a moment, a lengthwise cross sectional view across the bimorph is shown. As is evident from the diagram, the bimorph is a laminated structure including a pair of piezoelectric ceramic members 272 and 274, respectively. An electrical conductor 276 is sandwiched between the piezoelectric ceramic members with electrical conductors 278 and 280, respectively plated on the outside of the piezoelectric members. The conductors 278 and 280 (FIG. 6) are positioned so that the areas immediately joining one end is void of plating which prevents shorting of the bimorph when it is clamped in mounting brackets 258 and 260, respectively and voltage is applied to conductor 242 and 241, respectively. Conductors 242 and 241 are connected to plated electrical conductors 278 and 280, respectively. A third electrical conductor 282 is connected to the central conductor 276. In order to create the bending motion necessary for transposing the transducer, a voltage is applied to the terminals 242, 282, and 241, respectively. The bimorph may be operated in either the so-called parallel mode or the so-called serial mode. In the so-called serial mode of operation, the applied voltage is shared so that one half of the applied voltage appears between terminals 282 and 242; and the other half of the applied terminals appear across terminal 241 and 282, respectively. In the so-called parallel mode of operation, the entire voltage appears across both terminal pairs 242 and 282, 241 and 282. For purposes of the present invention, the bimorph can be connected in either the so-called parallel or the so-called series mode.

The parameters which are necessary to determine the size (such as, width W, length L, and thickness T) of the bimorph are determined by the response which is needed so that the bimorph will impart a predetermined oscillatory motion with the head mounted thereon. The response of the bimorph in turn is characterized by the parameters of the bimorph. The critical parameters are the resonant frequency in (Hz), blocked force in (grams force/volt) and displacement in (mils/volt). These parameters in turn are dependent upon the electromechanical characteristic of the bimorph. The manufacturers of bimorphs will give the values of these critical parameters. Although many different types of piezoelectric material can be used in fabricating the bimorph for use with the present invention the so-called Gulton G-1278 material is used. This material is fabricated by the Electronic Components Division of Gulton Industries, Inc. For this particular material, operating as a motor in series mode the following equations are given:

(i) Approximate resonant frequency (Hz)=

$$\frac{380}{L^2} \left[ \frac{1}{\frac{23.23 \, Wt}{WL} \left[ 1 + \frac{3\delta}{2L} \right]^2 + 1} \right]^{\frac{1}{2}}$$

(ii) Blocked force (lbs./volt)=0.00088 W/L
(iii) Displacement (mils/volt)=0.05 $L^2$
L=Length of bimorph (inches)
$\delta$=Distance from beam end to center of weight (inches)
W=Width of bimorph (inches)
Wt=Weight at end of birmorph (lbs.)

For proper operation of the device, the oscillatory motion of the bimorph motor which is lateral to the direction of normal head motion has to be lower than the resonant frequency of the bimorph. By substituting a value for each of the variables in the above equations a necessary limit of optimum parameters is established. According to the teaching of the present invention, it was determined that in order to follow a data track it is necessary that the bimorph has the following parameters: Length (L)=0.52 inches; Width (W)=0.47 inches; Thickness (T)=0.021 inches.

Figure 8:
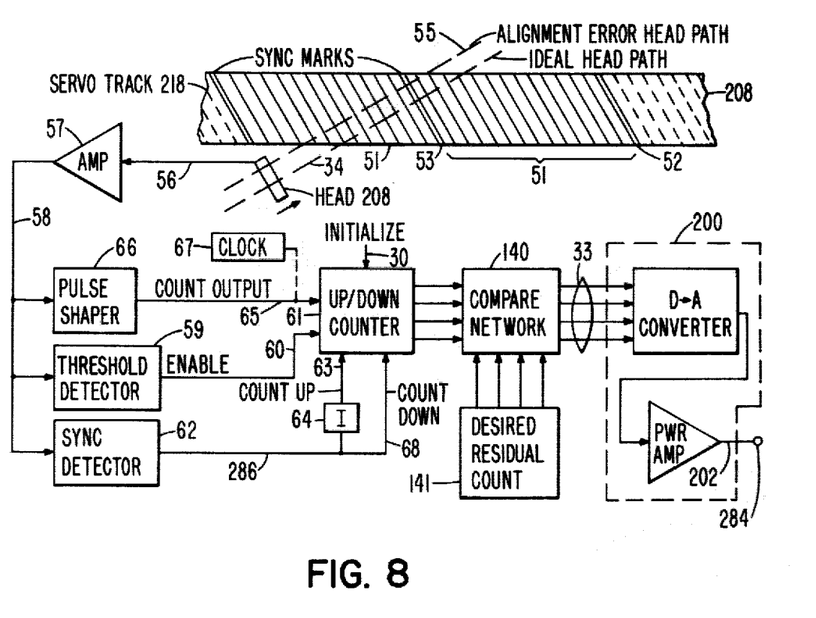
FIG. 8 shows an enlarged view of one of the servo tracks on the tape with a circuit for determining head/track misalignment and generating error signals. The error signals are used to drive the head to follow the distorted track.

As was stated previously, in order to move the bimorph motor in a direction lateral to the normal head motion a controlled voltage has to be developed. FIG. 8 depicts a device and apparatus which develop the control signal which is supplied to the bimorph motor for creating the oscillitory motion in the direction of head movement. The generated signal which may be a voltage appears at terminal 284. As was stated previously, and in accordance with FIG. 7 a plurality of longitudinal servo tracks 218, 220, 222, and 224 are positioned on media 14. The contents of the servo tracks are used to generate the control voltage which drives the bimorph motor. In FIG. 8 only one of the longitudinal servo tracks 218 is shown. The other servo tracks have characteristic substantially equivalent with servo track 218 and therefore will not be described any further. In FIG. 8 the width of the servo track 218 is enlarged. The servo track is made up of two distinctively different data patterns. Repeating data pattern 51 is a constant frequency data pattern. Each data pattern 51 begins and ends with a second distinctive data pattern, namely sync marks pattern 52 and 53. The servo track sync marks, two of which are identified as 52 and 53 may be double frequency data patterns alternately, may be any other type of data pattern or absense of data pattern, which is distinctively different from the constant frequency data pattern 51. The center of head 208 when following the ideal head path (that is, the path aligned with the center line of the data track) crosses the center of sync mark 53. If head 13 is misaligned with the traverse data track which is identified by sync mark 53, then the head path would be such as identified for example, by broken line 55. In the event, of this misalignment the length of tape 14 about the mandrel (FIG. 1) and thereby the servo track must be moved a small step to the left to bring the center of the heads path into coincident with or at least within the vicinity of the center of sync mark 53. Any additional correction which is necessary to force the head to follow a crooked (i.e., skewed and/or deformed) track such as that shown in FIG. 7 is effectuated by the present invention.

Still referring to the head alignment network of FIG. 8, the signal output of head 208 as it sweeps across servo track 218 appears on conductor 56. The output signal is applied to the input amplifier 57 and appears at amplifier output conductor 58. When this signal amplitude reaches a minimum threshold magnitude this threshold is detected by threshold detector 59 and the signal appears on conductor 60. This signal enables operation of an up-down counter 61. Since head 208 has just penetrated the lower leading edge of servo track 218, a sync mark has not been detected at this time and output 286 of sync detector 62 is not present. Thus, conductor 63 is enabled by way of inverter 64 so as to place counter 31 in a condition to count up.

As head 13 continues its sweep across servo track 218 counter 61 is driven by output 65 of pulse shaper 66. Pulse shaper 66 is effected to shape a constant frequency signal which is being provided from the servo tracks constant frequency format 51. Thus, this constant frequency format constitutes a clock means which is effective to increment the counter.

As an alternate approach, the count input to up-down counter 61 is supplied from a constant frequency clock 67.

As head 208 encounters sync mark 53, sync detector 62 is enabled and its output 286 becomes active, thus placing up-down counter in a count down or decrement mode, by way of conductor 68. The count magnitude contained within counter 61 at this instant is dependent upon the relative alignment between heads 13 and the data track identified by sync mark 53. For example, when head 208 follows ideal head path 34 the count within counter 51 will be smaller than had it been following misalignment path 55. In any event, as head 208 continues to sweep servo track 218 constant frequency portion 51 from the downstream side of 53 continues to be counted. However, counter 51 now counts down. As head 208 leaves servo track 50 the minimum signal threshold is again detected by detector 59 and counter 61 is inhibited from further counting.

A residual count is now trapped in up-down counter 61. The magnitude and sense of this count are a measure of the magnitude and direction of misalignment between the head path and the data track position as identified by sync mark 53. For example, if the initial state of counter 61 were a count of 0, the counters trapped or residual count would be 0 when the head follows the ideal head path. A positive residual count indicates that the alignment error is such as shown by track 55; a negative residual count indicates that the head is following a misalignment path displaced on the other side of path 34.

The residual count is presented to compare network 140 where it is provided as an input signal over conductor 33 to head actuator controller 200. The signal is conducted by conductor 202 to the bimorph motor.

As was previously described, the error signal generated from servo track 218 position the head via bimorph motor 206 to follow the center line of a data track. The up-down counter is then reset by a controlled signal on terminal 30. As the head approaches another servo track for example servo track 220 (FIG. 7), the aforementioned described process is again performed to generate another error correcting signal. This signal is applied to drive the head on track if it was off track. Likewise, as longitudinal servo track 222 is approached, the process is then repeated. In essence, the generation of the error signal is performed whenever the head accesses a longitudinal servo track. In case of the example shown in FIG. 7, the process is repeated four times until the head exit the tape. As such the head is forced to follow the data track in linear piecewise manner to recapture data therefrom.

With reference to FIG. 8, an alternative arrangement for generating the error signal to that of using networks 140 and 141 is to present up-down counter 61 to a count which will result in a known residual count when alignment is proper and will result in a residual count which may be used directly as an input to drive the bimorph motor via head controller 200. As is evident in FIG. 8, head controller 200 includes a digital to analog converter (D-A) connected to a power amplifier. The signal outputed on terminal 33 are converted by the d-a converter amplified in the power amplifier and is then supplied to the bimorph motor at a voltage level necessary for creating the bending of said motor.

As is evident from the above description the residual count in the Up-Down Counter (FIG. 8) is a measure of head/track misalignment. The residual count is used to drive transducing assembly 13 so that data recorded in skewed and/or deformed data tracks is recovered. Another method in which the residual count can be used to effectuate track following is the so-called "Averaging Method". In using the Averaging Method several residual counts are stored in a storage device. The storage device maybe a PLA microprocessor, microcomputer, etc. An average value is generated from the stored residual counts and is used to drive transducing assembly 13. In an alternate approach one of the stored values for example the last stored value is used.

The so-called "Skew Method" is another method by which the residual count in the Up-Down Counter is utilized to effectuate track following. With the skew method instead of using a single residual count to transpose the head a relatively large distance, the count is apportioned in a series of smaller counts and the head is transposed a series of smaller distances in accordance with the smaller counts.

Figure 9:
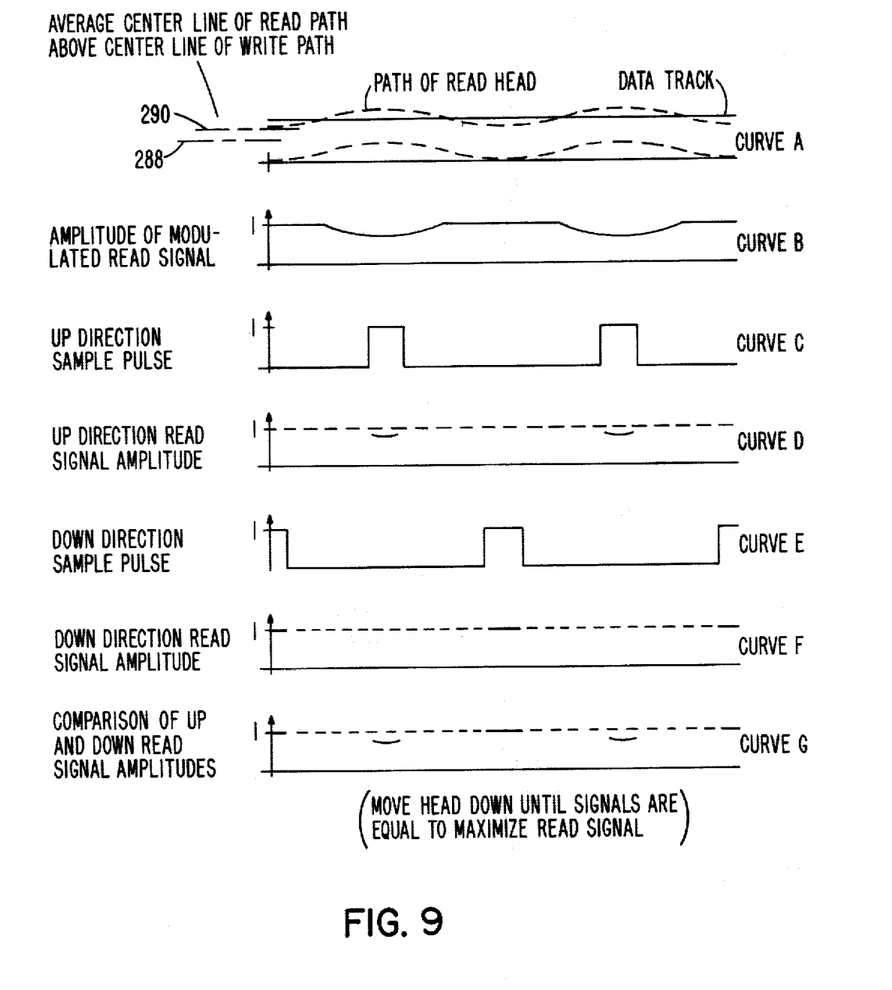
FIG. 9 shows a graphic representation of another embodiment for deriving an error signal which drives the head to follow a distorted track.
Figure 10:
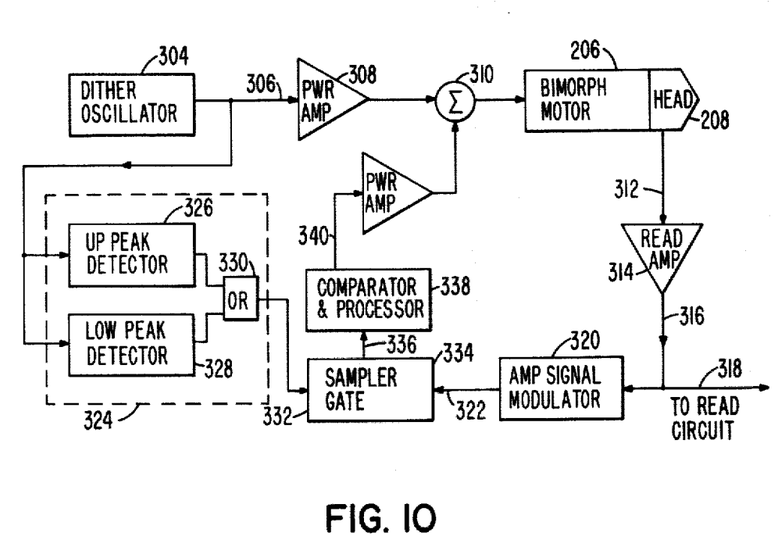
FIG. 10 shows in block diagram form a circuit for implementing the embodiment of FIG. 9.

Referring now to FIGS. 9 and 10, an alternate device and method are shown for deriving the error signals for driving the bimorph motor to achieve the desired motion. In FIG. 9, the generated signals are shown and is helpful in understanding the method, while in FIG. 10 the processing circuits which generate the curves in FIG. 9 are shown.

Referring now to FIG. 9, Curve A shows, in solid lines, a data track to be read and the path of the read head is shown in broken lines. For descriptive purposes, the width of the track is exaggerated. In reality, the width of the data track is within the range from 2 to 8 mils. Also, in reality the track is positioned slantwise across the media as is shown in FIG. 7. For purposes of description, however, the track is shown in an horizontal orientation. The track as shown in curve 8 is also a normal track. That is, the track as shown by the solid lines is not deformed and/or skewed. The center line of the path is shown by line 288. While the centerline of the path of the read head is shown by line 290. Assuming that the head is aligned properly with the data track, the head would progress with its gap along the center line 288 to transduce the data from the data track. However, in accordance with the teaching of the present invention, a dither voltage is applied to the bimorph motor. Due to the result of the dither voltage, the head generates a path shown by the broken line in Curve A. The center line for the read path is shown by line 290. It is obvious from Curve A that by imposing a new path for the read head the center line moves from the true center line of the data track when it was originally written. The output signal generated from the head is a composite signal including the deformed path of the read head together with the outline of the data track. The output signal from the head is then processed through a modulation circuitry to generate a modulated read signal shown in Curve B. Curve C shows a first set of sample pulses which are developed from the modulated read signal. In the figure, only two of the sample pulses are shown. In actuality a plurality of these pulses are generated. The first set of samples were spaced along a horizontal axis to coincide with the peaks or up direction of the modulated read signal. Curve E depicts a second set of sample pulses which are generated from the modulated read signal. The second set of sample pulses are staggered relative to the first set of sample pulses shown by Curve C and are positioned along a horizontal axis. Each of the second set of sample pulses coincide with the down direction or lowest point of the paths of read head. Both the up and down sample pulses (Curve C and Curve E) are gated with the amplitude modulated signal curve B to generate up direction read pulses curve D and down direction read pulses curve F. The up direction read pulse and the down direction read pulse are next compared (Curve G). The comparison can be done on a one to one basis or a series of down direction pulses are generated and the average is compared with the average of the series of up direction read pulses. Regardless of the comparison method used, the difference between the up direction read signal pulse and the down direction read signal pulse is the error signal which is outputted on conductor 300 (FIG. 1). The readback signal from the head is contained on conductor 31. Turning to FIG. 1 for the moment, the output from dither control means 204 is dot ored at point 302 with the control signal from head actuator controller 200 and is supplied to the bimorph motor. In FIG. 9, Curve G, the fact that the down direction read pulses are greater than the up direction read pulse indicates that the dither voltage which is applied to the motor has to be adjusted to bring the head down. It should be noted that the dither signal which is imposed on the bimorph motor is such that the bending of the motor is greater in amplitude and frequency than the data track, be it a deformed or normal data track. The procedure ensure that any data recorded in a deformed data track is recovered.

Referring now to FIG. 10, a circuit is shown in block diagram form which generate the error voltage discussed in FIG. 9 and is shown as dither control means 204 in FIG. 1. In FIG. 10 the head 208 is shown connected to bimorph motor 206. A dither oscillator 304 outputs a controlled signal on terminal or conductor 306. The signal on terminal 306 is fed to power amplifier 308. The signal is then fed into summing circuit 310 from which it is fed to the bimorph motor 206. As was previously described the applied signal which may be a voltage signal forces the bimorph motor to vacillate and impose a deformed read path as is shown in the broken line of Curve A, FIG. 9. As the head moves across the track a superimposed signal is outputted on terminal 312. The signal is detected and read by read amplifier 314 and is outputted on conductor 316. From conductor 316, the read signal is transported over conductor 318 to read circuits (not shown). The read circuits does not form part of the present invention and will not be described. The read signal on conductor 316 is supplied to amplitude signal modulator 320 where it is processed and outputted as a modulated amplitude signal on conductor 322. Concurrently, with processing of the read signal the signal which is outputted from the dither oscillator on conductor 306 is fed into a sampling pulse generator 324. By way of example, the sampling pulse generator includes an Up peak detector 326 and a Down peak detector 328. The up peak detector detects the maximum amplitude of the trajectory of the oscillating head path while the Down peak detector 328 detects the lowest point or value of the head trajectory. The analysis assumes that the head's trajectory is substantially identical with the voltage waveform outputted from the dither oscillator 304. The output of the Up peak detector and the down peak detector is then fed into logical or circuit means 330 from which a plurality of staggered Up sample pulses and Down sample pulses are generated on conductor 332. The output is then fed into sample gate 334 where the signal is gated with the feedback signal on conductor 322. The output from the sampling gate is fed over conductor 336 to a comparator. The comparator 338 can be any conventional minicomputer, microprocessor, ROM, etc. The processor compare the down direction of the read amplitude with the up direction of the read amplitude to generate an error signal on conductor 340. The signal on conductor 340 is processed by power amplifier 342 and is fed into summing circuit 310 where an error signal is derived for driving bimorph motor 206. As is evident from the description in the alternative method, the amplitude of the distorted read path is used for generating the error signal.

In view of the above description the method which allows a rotating head device to follow a data track may be summarized with the following steps:

(a) Mounting the head on an actuator having lateral motion;
(b) mounting the actuator on a rotating member;
(c) positioning the head within the vicinity of a selected data track;
(d) generating controlled voltages;
(e) applying the controlled voltages to the actuator; and
(f) generating a head trajectory substantially identical with the data track so that prerecorded data is transduced from the data track.

Operation

In operation an execute step is issued on terminal 24 (FIG. 1). The execute step is a signal which informs the system to position a specific track on media 14 in alignment with transducing assembly 13. The signal is processed by position servo 22 which energizes dc motor 21 to rotate the take up reel 20 so that the selected track is in initial registration with the transducing assembly. With reference to FIG. 7, assuming that the track is a straight track such as track or strips 36 and transducing assembly 13 is properly aligned with the track, then transducing assembly 13 on accessing longitudinal track 218 generate no error signal in up/down counter 61. Since the head is in proper alignment with the track, no corrective action is taken. Similarly, on accessing servo track 220, the same process is performed. The head being on track, no corrective action is taken. The process is repeated at servo track 222 and 224, respectively, until the head exit the tape.

Assuming now that the track is deformed, that is crooked as stripe 210 or skewed as stripe 214. The head on accessing servo track 218 while traversing either track 210 or 214 generates the corrective signal. Since the head is in proper alignment, initially no corrective action is taken. On accessing longitudinal servo track 220, the head is now off track and an error signal is generated by counting the constant frequency servo signals on either side of the double frequency bit. This time a number is trapped in the up/down counter indicating that the head is off track. The number is converted from a digital to an analog voltage by D-A converter (FIG. 8) amplified and is used to drive the head on track. The head on accessing longitudinal servo track 222 again generates an error number in the up/down counter. That number is used in a similar fashion to drive the head so that it traverse the crooked and skewed stripe to access data which would be normally lost.

When track following is achieved by the alternative method described above, and shown in FIG. 9 and FIG. 10 an oscillatory voltage is developed by dither oscillator 304. The oscillatory voltage is amplified by power amplifier 308 pass through summing circuit 310 and applied to the bimorph motor which dither the head in a direction perpendicular to the direction to normal head travel. The applied dither voltage is characterized in that it generate an oscillatory motion in the head which has an amplitude and frequency greater than the amplitude and frequency of distortion of the data track to be read. As the head crosses the selected track it generates a composite signal comprising of the envelope of the data track and the envelope of the oscillatory read path. The signal is amplitude modulated and two sets of sample pulses are generated therefrom. The first set of sample pulses are generated from the highest peak of the read head path and the other set of sample pulses is derived from the lowest point of the read head path. The first set of sample pulses and the second set of sample pulses are staggered in a horizontal orientation with respect to each other. The sample pulses are used for gating the modulated read signal. A first set of read signal pulses in the up direction is generated and a second set of read signal pulses in the down direction is generated. The two sets of signals (that is the Up-direction signal pulses and the Down direction signal pulses) are compared to generate an error voltage which is summed with the dither voltage to generate a correction voltage for driving the head assembly 13.

When track following is achieved by the above described method and apparatus, the following advantages accrue to a user:

1. The above described invention allows an increase in data rate and storage capacity. The increase data rate occurs because the track recorded on the media is narrower than was heretofore been possible. More particular, the track is within the range of from 2 to 6 mils. Also track to track access time is reduced.
2. The above invention allows a reduction of media manufacturing tolerance. This advantage reduces the cost of media manufacture.
3. The invention improves media interchangability between data recording devices (DRD).
4. The invention is relatively easy to implement in comparison with other types of track following schemes.
5. The invention minimizes the effect of long and short term temperature and humidity problems associated with flexible media. Particularly, data in skewed and deformed data track is recovered.
6. The invention allows relaxation of the manufacturing tolerances for DRD.

While I have illustrated and described the preferred embodiments of my invention, it is to be understood that I do not limit myself to the precise constructions herein disclosed and the right is reserved to all changes and modifications coming within the scope of the invention as defined in the appended claim.

We claim:

1. A method for reproducing data from deformed data tracks, positioned on a recording surface, said method comprising:
   (i) positioning a reproducing transducer within the vicinity of the deformed data tracks;
   (ii) generating a dither signal for positioning the reproducing transducer, said dither signal having a frequency and amplitude greater than the amplitude and frequency of distortion of the deformed data tracks;
   (iii) generating a first set of sampling pulses indicating the maximum peak values of the dither signal;
   (iv) generating a second set of sampling pulses indicating the minimum peak values of the dither signal;
   (v) generating a feedback signal representative of the path traversed by the reproducing transducer;
   (vi) gating the feedback signal with the first set of sampling pulses to reproduce a third set of pulses;
   (vii) storing the third set of pulses;
   (viii) gating the feedback signal with the second set of sampling pulses to reproduce a fourth set of pulses;
   (ix) storing the fourth set of pulses; and
   (x) comparing the third and fourth set of pulses whereby the difference between said pulses is an error signal for adjusting the dither signal.

2. Method for enhancing track following in a helically scanned magnetic tape device comprising of the following steps in combination:
   positioning a magnetic head within the vicinity of a data track on the tape;
   dithering the head to trace a nonlinear path, said nonlinear path being relative to the data track and in a direction orthogonal to the direction of normal head travel;
   monitoring the head output signals and generating digital signals representative of the maximum and minimum peaks of the nonlinear path; and
   correlating the digital signals to generate one or more error signals for driving the head to follow said track.

3. In a rotating head magnetic tape transport unit wherein a length of magnetic media is positioned relative to the rotating head and data is being transduced from oblique data track, a method for recovering data from a deformed data track comprising of the following steps:
   (i) generating a first control signal;
      said control signal characterized by a frequency and amplitude greater than the frequency and amplitude of the deformed data track;
   (ii) applying the control signal to the head so that the head generates a trace having the characteristic of the control signal;
   (iii) generating a feedback signal indicative of the instantaneous position of said head relative to the deformed track;
   (iv) generating a first set of sample pulses from the first control signal;
   (v) generating a second set of sample pulses from the first control signal;
   (vi) gating the feed back signal with the first set of sample pulses to generate a first position pulse;
   (vii) gating the feedback signal with the second set of sample pulses to generate a second position pulse; and
   (viii) comparing the first and second position pulses to generate an error pulse indicative of head/track misalignment.

4. The method as claimed in claim 3 wherein the first set of sample pulses and the second set of sample pulses are being generated from the maximum peak and minimum peak of the first control signal, respectively.

5. In a magnetic tape recorder wherein a transducer is mounted onto a rotating transducer support with a length of flexible media being positioned relative to said transducer an improved means for following a data track comprising:
   a positioning means coupled to the transducer and operable for transporting said transducer in a direction orthogonal to the direction of transducer rotation;
   means for generating a dither signal, said dither signal being operable to drive the positioning means so that the transducer traces a nonlinear path;
   means for generating control pulses representative of the maximum and minimum peaks of the dither signal;
   means to monitor the transducer and to generate an instantaneous position signal; and
   means for correlating the control pulses with the instantaneous position signal of the transducer and to output an error signal to the positioning means whereby the transducer is periodically adjusted to follow and recover data in the data tracks.

6. An improved rotating head apparatus comprising:
   a length of magnetic media said media having transverse data track thereon;
   a first positioning means for positioning the rotating head so as to access the transverse data track;
   a second positioning means responsive to a dither signal, for dithering the head in a direction perpendicular to the direction of travel across said data track;

means for generating the dither signal;

means for generating sample pulses representative of the maximum and minimum amplitude of the dither signal;

reproducing means including the rotating head to generate a position signal indicative of the dither signal and the track signal; and processing means for correlating the sample pulses with the position signal and periodically generating an error signal for driving the second positioning means so that the head follows a data track.

7. The apparatus as claimed in claim 6 wherein the second positioning means is a bimorph motor.

8. The apparatus as is claimed in claim 7 wherein the means for generating the dither signal includes an oscillator, said oscillator generating the dither signal with amplitude and frequency greater than the amplitude and frequency of distortion of the data track.

9. The apparatus as claimed in claim 8 wherein the processing means include:

an amplitude signal modulator means operable to output a modulated signal;

a gating means, coupled to said modulated means, operable to gate the modulated signal with a set of control pulses and to output positional pulses; and means for comparing the positional pulses and outputting error pulses.

* * * * *